Oct. 6, 1953
G. A. LYON
2,654,637
WHEEL COVER
Filed Jan. 11, 1950
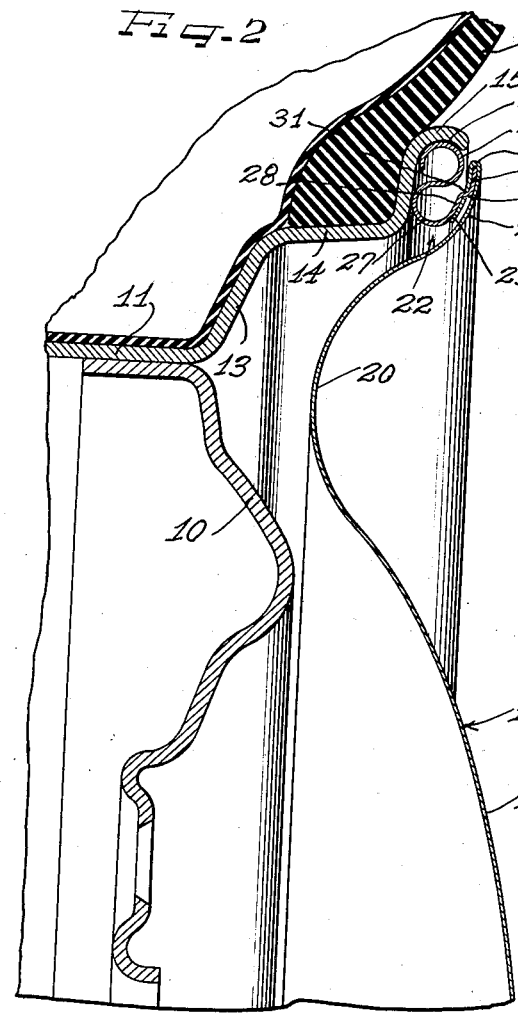
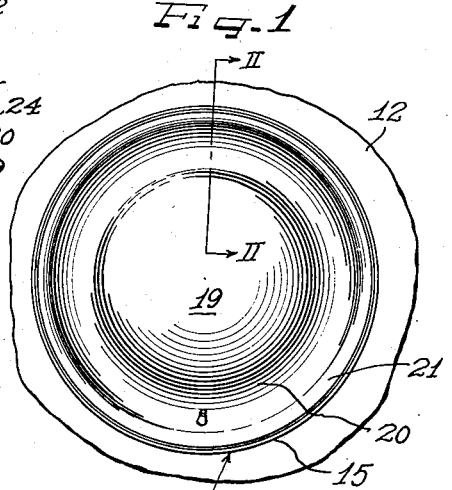
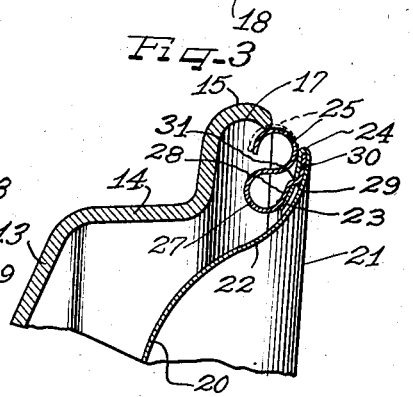
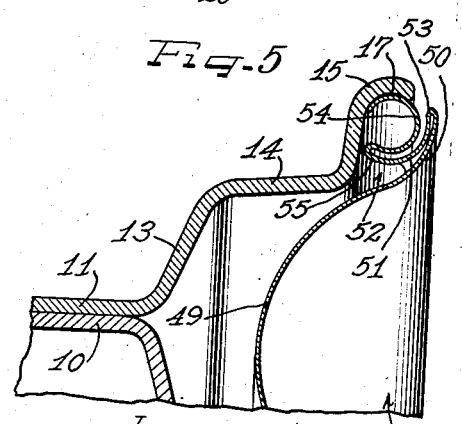
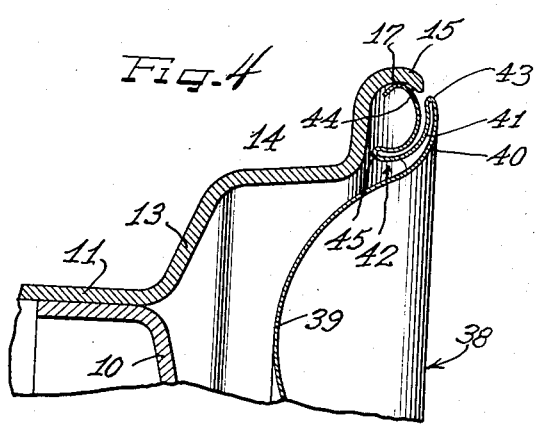
Inventor
GEORGE ALBERT LYON
by The Firm of Charles W. Hills
Attys.

Patented Oct. 6, 1953

2,654,637

UNITED STATES PATENT OFFICE 2,654,637

WHEEL COVER

George Albert Lyon, Detroit, Mich.

Application January 11, 1950, Serial No. 137,990

11 Claims. (Cl. 301—37)

The present invention relates to improvements in wheel structures, and more particularly concerns novel structures for protectively and ornamentally covering the outer sides of vehicle wheels such as automobile wheels.

An important object of the present invention is to provide an improved wheel structure in which a novel ornamental and protective cover construction is utilized at the outer side of a vehicle wheel such as an automobile wheel.

Another object of the invention is to provide a novel wheel structure in which a cover having novel retaining means is applied to the outer side of the wheel with the retaining means in retaining engagement with the terminal flange of the tire rim of the wheel.

A further object of the invention is to provide an improved vehicle wheel cover having novel retaining clip means for retainingly engaging the terminal flange of the tire rim of a wheel for retaining the cover on the wheel.

Still another object of the invention is to provide improved retaining clip means for retaining vehicle wheel covers in place on a vehicle wheel.

According to the general features of the present invention there is provided in a wheel structure including a wheel body and a tire rim and wherein the tire rim has a terminal flange providing a radially inwardly opening annular groove adjacent the outer extremity of the terminal flange, a wheel cover for disposition at the outer side of the wheel and having retaining clip means thereon comprising a resilient serpentine structure providing a retaining shoulder directed generally radially outwardly and retainingly engageable in the groove of the tire rim and resilient connecting means for the loop with the margin of the wheel cover and resiliently deflectable to enable engagement of the cover margin with said loop on relative axial deflection of the clip and cover margin as permitted by said resilient connecting structure.

According to other general features of the invention the retaining clip structure is formed separately from and is connected to the wheel cover through the medium of an underturned marginal flange on the cover.

According to still other general features of the invention the retaining clip structure comprises integral inward extension of an underturned marginal flange of the wheel cover.

According to yet other general features of the invention there is provided in a cover for disposition at the outer side of a vehicle wheel, a wheel cover body having an underturned marginal flange, said marginal flange having a retaining clip thereon of serpentine formation including a generally radially extending loop engageable with a part of the wheel with which the cover is assembled and a sinuous resilient portion connecting the loop with the underturned flange.

Other objects, features and advantages of the present invention will be readily apparent from the following detailed description of certain preferred embodiments thereof taken in conjunction with the accompanying drawings in which:

Figure 1 is a side elevational view of a vehicle wheel having thereon a cover according to the present invention;

Figure 2 is an enlarged radial sectional detail view taken substantially on the line II—II of Figure 1;

Figure 3 is a sectional view similar to Figure 2 but showing the cover in process of being applied;

Figure 4 is a sectional view similar to Figure 2 but showing a modified construction of the cover; and Figure 5 is a sectional view similar to Figure 4 but showing a further modified form of cover.

As shown on the drawings:

A vehicle wheel with which the present invention is adapted to be used, such as an automobile wheel includes a wheel body 10 and a tire rim 11. The tire rim is of the multi-flanged, drop center type adapted to support a pneumatic tire and tube assembly 12 and including a generally radially extending side flange 13, a generally axially outwardly extending intermediate flange 14, and a terminal flange 15 which has the extremity portion thereof generally curved to provide a radially inwardly opening annular groove 17.

Disposed in protective, ornamental relation to the outer side of the wheel is a cover 18 which in the present instance is shown as of the full disk type, that is adapted to cover substantially the entire outer side of the wheel and preferably formed from appropriate gauge sheet material such as sheet metal which is finished as desired on the outer side, as by polishing, plating or the like.

The cover 18 preferably comprises a central crown portion 19, an intermediate generally dished annular portion 20 of concave cross section, and an outer marginal portion 21 of convex cross section and preferably arranged to overlie the outer side of the tire rim and more particularly the terminal flange 15 thereof and with the edge extremity of the cover lying in spaced relation to the extremity edge of the tire rim terminal flange.

In order to retain the cover on the wheel, means are provided for snap-on, pry-off engagement with the terminal flange 15 of the tire rim. To this end, the cover margin 21 is equipped with a series of retaining spring clips 22 which are constructed and arranged for snap-on, pry-off engagement within the radially inward groove 17 of the tire rim terminal flange. There may be as many of these spring clips 22 as desired disposed behind the marginal portion 21 of the cover and preferably arranged in symmetrically spaced relation about the periphery of the cover. As shown in Figures 1, 2 and 3, the spring clips 22 are preferably formed separately from the cover body and are assembled with an underturned marginal flange 23 on the cover. This flange comprises an integral flange in one piece with the marginal portion 21 of the cover and preferably lies in spaced parallel relation therebehind, being joined therewith on a short radius reinforcing rib 24 which projects generally radially outwardly and lies in spaced relation to the tip or extremity edge of the terminal flange 15.

Each of the clips 22 is preferably formed from appropriate gauge spring sheet metal such as spring steel and comprises a retaining loop 25 which provides a generally radially outwardly projecting arcuate shoulder engageable in retaining relation within the groove 17 of the tire rim. By preference the loop 25 is of an initial radius which is slightly greater than the radius of the groove 17 so that in assembly the loop 25 effects a snug tensioned somewhat curled, contractile engagement within the groove 17.

Each of the clips 22 has resilient means connecting the same to the flange 23. For this purpose each of the clips 22 is formed with a repose connecting loop 27 having a base 28 including an offsetting bend 29 and a terminal flange 30. The terminal flange 30 is clamped between the reentrant inner groove portions of the marginal portion 21 of the cover and the marginal flange 23, while the offsetting bend 29 extends through a slot 31 in the flange 23 and with the body portion 28 resting against the axially inner face of the flange 23 radially inwardly from the slot 31. Thereby the base of the clip is interlocked with the flange 23 and is clamped between the flange 23 and the marginal portion 21 of the cover. In side elevation each of the clips 22 is of sinuous S-shape or gooseneck shape.

Each of the clips 22 has the retaining loop portion 25 thereof preferably projecting radially outwardly beyond the edge extremity 24 of the cover to a sufficient extent to effect resilient, retaining engagement with the tire rim terminal flange 15. Therefore, in order to apply the cover to the wheel, the cover is disposed in generally centered relation to the outer side of the wheel and with the loops 25 of the clips engaging the edge of the tire rim terminal flange 15 substantially as shown in Figure 3. In this position, the radially outwardly facing shoulder of the loop 25 of each of the clips tends to restrain further radial inward movement of the cover. Therefore axially inward force applied to the cover causes the loops 27 of the clips to flex and that portion of the underturned marginal flange 23 of the cover therefore enters into engagement with the axially outer side of the retaining loop 25 of each of the clips so that as further axially inward force is applied to the cover the cover margin acting against the retaining loops 25 of the clips forces the same to cam inwardly and curl upon themselves sufficiently as well as to further flex the loops 27 more or less radially inwardly and by this compound flexure displace the loops 25 sufficiently radially inwardly to snap past the radially inwardly directed edge of the terminal flange 15 and into the groove 17 of the terminal flange. After the clip loops 25 have snapped into retaining relation within the terminal flange groove 17, the cover is retained effectively in generally floating relation upon the wheel, the resilience of the clips enabling not only generally radial movement of the cover but also axial movement. Tension of the clips 22 to afford substantial resistance to axial inward displacement of the cover is enhanced by engagement of the axially inwardly facing shoulders of the loops 27 against the axially outwardly facing generally radially extending portion of the terminal flange 15.

To remove the cover 18 from the wheel, a pryoff tool such as a screw driver or the like (not shown) may be inserted into the gap between the edge of the tire rim terminal flange 15 and the extremity 24 of the cover and leverage applied to force the margin of the cover axially outwardly until the resilient spring clips have snapped out of engagement with the tire rim terminal flange 15.

If desired and where the inherent resilience of the material from which the cover is made permits, the retaining clips for the cover may be formed integrally in one piece with the cover as shown in Figure 4. In this form of the invention, a cover 38 which may also be of a full disk type and including an intermediate concave cross section portion 39 merging with a relatively small radius convex marginal portion 40 having an underturned marginal reinforcing flange 41, has retaining clips 42 formed integrally in one piece with the flange 41. By preference the underturned reinforcing marginal flange 41 is of substantial width and extends generally radially and axially inwardly generally complementary to the curve of the marginal portion 40 and is joined with such marginal portion on a very small radius reinforcing terminal rib 43.

Each of the clips 42 comprises a one piece integral extension of the marginal flange 41 and may be formed of any width desired, including a tire rim terminal flange engagement and retaining loop 44 and a return bent sinuous conecting resilient portion 45. In this form of the invention the loop 44 is of large radius, generally complementary to the radius of the underturned flange 41 and lying in spaced relation thereto. The radially outer portion of the loop 44 provides a retaining shoulder which preferably projects radially outwardly beyond the cover terminal edge 43 to a distance which assures snug retaining, tensioned engagement within the channel or groove 17 of the tire rim terminal flange.

Similarly as described in connection with the form of Figure 2, the clips 42 of the cover 38 are interengaged with the tire rim terminal flange in a preliminary sense by resting the axially inner sides of the loops 44 against the edge of the terminal flange and then applying axial inward force against the cover to cause the flange 41 to engage against the opposing axially outwardly facing shoulder of the loops 44 and then by further pressure flexure of the loop 44 and the connecting sinuous portion 45 enables the clips 42 to snap into retaining engagement within the terminal flange groove 17. In this retained interengaged relationship, the clips 42 support the wheel cover in substantially floating condition both radially and axially. Axially inward movement of the cover is, of course, limited by engagement with the humps or backs of the cover retaining spring loops 44 which serve as cushioning stops for the cover.

In the modification of Figure 5, a cover 48 of one piece sheet material construction is shown including an intermediate dished or concave portion 49 and a convex marginal portion 50 having an underturned marginal flange 51 upon which are formed integrally in one piece as generally inward extensions of the edge of the flange resilient sinuous generally gooseneck retaining clips 52. The juncture of the flange 51 with the marginal portion 50 is on a very short radius stiffening and reinforcing rib 53 which in assembly lies in spaced relation to the edge of the terminal flange 15. Each of the retaining clips 52 of the cover includes a generally arcuate retaining loop 54 facing generally radially outwardly and of a diameter to engage in snug tensioned engagement within the groove 17 of the tire rim. Similarly as the clips 22, the clips 52 have the loops 54 thereof initially slightly larger radius than the cross sectional radius of the grooves 17 so that there is an expansion uncurling resilient snug engagement within the groove 17 in the assembled relation of the cover with the wheel.

Each of the loops 54 is connected to the flange 51 by a sinuous return bent more or less resilient connecting loop 55 which, similarly as with the clips 42, is generally collapsed on itself so that substantial resilience in a radial direction is afforded for the loops 54 which are connected thereby to the inner edge of the underturned marginal flange 51.

In applying the cover 48, the axially inner sides of the shoulders afforded by the clip loops 54 are applied to the edge of the tire rim terminal flange 15 and axially inward pressure applied to the cover to resiliently stress the clips 52 into engagement with the tire rim terminal flange, the flange 51 coming into engagement with the axially outer side of the loops 54 in forcing the clips into retaining engagement with the terminal flange.

Both the covers 38 and 48 can be readily dislodged from the tire rim by applying pry-off tool force to the reinforced edge of the cover by inserting the pry-off tool between the edge of the terminal flange 15 of the tire rim and the edge of the cover and levering the cover axially outward until the resilient clips yield and release the cover from the wheel.

In all forms of the invention the cover is retained at a plurality of points on the tire rim by the respective resilient clips which serve as resiliently yieldable yet firm retaining structures and afford floating, resiliently cushioned attachment of the wheel cover on the wheel. By reason of the marginal gap persisting in assembly between the edge of the cover and the edge of the terminal flange of the tire rim, adequate air circulation between the edge of the cover and the tire rim is provided for where that is desired. The clips serve not only as retaining structures but also as effective resilient buffers for the cover to resist damage to the cover from engagement with objects such as curbing during service.

It will be understood that modifications and variations may be effected without departing from the scope of the novel concepts of the present invention.

The following claims are limited to the species disclosed herein, since the generic claims will be found in my copending application Serial No. 306,662, filed August 27, 1952, which is a continuation-in-part of an application filed earlier than the instant application but now abandoned.

I claim as my invention:

1. In a wheel structure including a wheel body and a tire rim and wherein the tire rim has a terminal flange providing a radially inwardly opening annular groove adjacent the outer extremity of the terminal flange, a wheel cover for disposition at the outer side of the wheel and having retaining clip means thereon comprising a resilient serpentine structure providing a retaining shoulder loop curled under and directed generally radially outwardly and retainingly engageable in the groove of the tire rim, and resilient connecting means for the loop with the margin of the wheel cover and having a return bent juncture with the radially inner side portion of the loop, said connecting means being resiliently deflectable to enable engagement of the cover margin with said loop on relative axial deflection of the clip and cover margin as permitted by said resilient connecting means.

2. In a wheel structure including a wheel body and a tire rim and wherein the tire rim has a terminal flange providing a radially inwardly opening annular groove adjacent the outer extremity of the terminal flange, a wheel cover for disposition at the outer side of the wheel and having retaining clip means thereon comprising a resilient serpentine structure providing a retaining shoulder loop curled under and directed generally radially outwardly and retainingly engageable in the groove of the tire rim, and resilient connecting means for the loop with the margin of the wheel cover and having a return bent juncture with the radially inner side portion of the loop, said connecting means being resiliently deflectable to enable engagement of the cover margin with said loop on relative axial deflection of the clip and cover margin as permitted by said resilient connecting means, the retaining clip structure being formed separately from and connected to the wheel cover through the medium of an underturned marginal flange on the cover.

3. In a wheel structure including a wheel body and a tire rim and wherein the tire rim has a terminal flange providing a radially inwardly opening annular groove adjacent the outer extremity of the terminal flange, a wheel cover for disposition at the outer side of the wheel and having retaining clip means thereon comprising a resilient serpentine structure providing a retaining shoulder loop curled under and directed generally radially outwardly and retainingly engageable in the groove of the tire rim and resilient connecting means for the loop with the margin of the wheel cover and having a return bent juncture with the radially inner side portion of the loop, said connecting means being resiliently deflectable to enable engagement of the cover margin with said loop on relative axial deflection of the clip and cover margin as permitted by said resilient connecting means, the retaining clip structure comprising integral inward extension of an underturned marginal flange of the wheel cover.

4. In a wheel structure including a multi-flanged tire rim having a terminal flange including a generally radially extending portion and a generally axially extending portion, the axially extending portion having a generally radially inwardly opening annular groove, a cover member for the outer side of the wheel including an outer marginal portion having a plurality of retaining clips therebehind, each of said clips including a curled contractile loop portion engaging in said groove and a radially inner loop portion connected to the cover margin, said engaging loop portion having an axially outer intermediate side portion thereof opposing the marginal portion of the cover and engageable thereby to force the engaging loop portions of the clips past the extremity of the terminal flange of the tire rim when applying the cover to the wheel, said inner loop portion extending generally axially inwardly and opposing said radially extending portion of the tire rim terminal flange.

5. In a wheel structure including a multi-flanged tire rim having a terminal flange including a generally radially extending portion and a generally axially extending portion, the axially extending portion having a generally radially inwardly opening annular groove, a cover member for the outer side of the wheel including an outer marginal portion having a plurality of retaining clips therebehind, each of said clips including a curled contractile loop portion engaging in said groove and a radially inner loop portion connected to the cover margin, said inner loop portion extending generally axially inwardly and opposing said radially extending portion of the tire rim terminal flange, said groove engaging loop portion affording a generally axially outwardly facing shoulder normally lying in spaced relation to the marginal portion of the cover and being engageable by said marginal portion of the cover upon flexure of said connecting loop portion of the clips.

6. In a cover for disposition at the outer side of a vehicle wheel including a multi-flanged tire rim having a terminal flange formed with a radially inwardly opening groove, a cover body having a marginal flange portion adapted to lie in assembly adjacent to the terminal flange of a tire rim, said marginal flange having an underturned reinforcing flange, said reinforcing flange having a plurality of sinuous retaining clips each of which includes a radially outer curled contractile loop adapted to engage in the groove of the tire rim terminal flange and a radially inner loop connected to the underturned marginal flange.

7. In a cover for disposition at the outer side of a vehicle wheel including a multi-flanged tire rim having a terminal flange formed with a radially inwardly opening groove, a cover body having a marginal flange portion adapted to lie in assembly adjacent to the terminal flange of the tire rim, said marginal flange having an underturned reinforcing flange, said reinforcing flange having a plurality of sinuous retaining clips each of which includes a radially outer curled contractile loop engageable in the groove of the tire rim terminal flange and a radially inner loop connected to the underturned marginal flange, each of said loops being of similar radius so that the clips have generally S-shaped profile.

8. In a cover for disposition at the outer side of a vehicle wheel including a multi-flanged tire rim having a terminal flange formed with a radially inwardly opening groove, a cover body having a marginal flange portion adapted to lie in assembly adjacent to the terminal flange of the tire rim, said marginal flange having an underturned reinforcing flange, said reinforcing flange having a plurality of sinuous retaining clips each of which includes a radially outer curled contractile loop engageable in the groove of the tire rim terminal flange and a radially inner loop connected to the underturned marginal flange, the radially outer loop in each instance being of large radius and the inner loop being of relatively flattened structure and with the bight of the loop extending generally axially inwardly.

9. In a cover for disposition at the outer side of a vehicle wheel having a tire rim including a generally radially inwardly opening annular groove, a cover body having a marginal portion including an underturned flange of arcuate section with the edge extending generally axially inwardly and having a plurality of retaining clips thereon including curled contractile loops of similar section and in spaced relation within the channel defined by the flange and a substantially closed loop at the radially inner sides of the first mentioned loops connecting the first mentioned loops to the flange, the first mentioned loops having radially outwardly facing shoulders engageable resiliently in retaining relation within the groove of the tire rim.

10. In combination in a wheel cover for disposition at the outer side of a vehicle wheel, a cover body, said body having a marginal portion, an underturned flange on said marginal portion, and a plurality of S-shaped clips having base portions interconnected with said underturned flange and curled contractile loops engageable with a part of a vehicle wheel to retain the cover in snap-on, pry-off relation.

11. In a cover for disposition at the outer side of a vehicle wheel, a cover body having a marginal portion, an underturned flange on said marginal portion, and said marginal portion having a retaining clip thereon, said retaining clip being of sinuous form including a radially outer curled contractile loop and a radially inner loop, said radially inner loop being connected to the marginal flange and the radially outer loop being disposed behind the marginal flange and engageable with the marginal flange upon relative axial movement of the marginal flange and the outer loop as permitted by resilience of the clip.

GEORGE ALBERT LYON.

References Cited in the file of this patent

UNITED STATES PATENTS

| Number | Name | Date |
| --- | --- | --- |
| 2,368,228 | Lyon | Jan. 30, 1945 |
| 2,394,958 | Wood | Feb. 12, 1946 |
| 2,404,389 | Lyon | July 23, 1946 |